(12) United States Patent
Gruber et al.

(10) Patent No.: US 9,155,011 B2
(45) Date of Patent: Oct. 6, 2015

(54) METHOD FOR TRANSMITTING DATA IN A WIRELESS RADIO NETWORK

(75) Inventors: Claus Gruber, Köln (DE); Matthias Kutschenreuter, München (DE); Christian Schwingenschlögl, Putzbrunn (DE); Andreas Ziller, München (DE)

(73) Assignee: Siemens Aktiengesellschaft, Munich (DE)

( * ) Notice: Subject to any disclaimer, the term of this patent is extended or adjusted under 35 U.S.C. 154(b) by 1487 days.

(21) Appl. No.: 12/670,891

(22) PCT Filed: Jun. 26, 2008

(86) PCT No.: PCT/EP2008/058181
§ 371 (c)(1),
(2), (4) Date: Jun. 28, 2010

(87) PCT Pub. No.: WO2009/015953
PCT Pub. Date: Feb. 5, 2009

(65) Prior Publication Data
US 2010/0260094 A1    Oct. 14, 2010

(30) Foreign Application Priority Data
Jul. 27, 2007   (DE) .......................... 10 2007 035 186

(51) Int. Cl.
*H04B 7/14* (2006.01)
*H04W 4/00* (2009.01)
(Continued)

(52) U.S. Cl.
CPC .............. *H04W 36/18* (2013.01); *H04W 84/22* (2013.01); *H04W 92/20* (2013.01)

(58) Field of Classification Search
CPC ............................. H04W 36/18; H04W 92/20
USPC ......................................... 370/315, 331, 338
See application file for complete search history.

(56) References Cited

U.S. PATENT DOCUMENTS 5,914,948 A    6/1999 Frank
2003/0058824 A1 *  3/2003 Petterson et al. ............. 370/338
(Continued)

FOREIGN PATENT DOCUMENTS

| EP | 0618688 A2 | 10/1994 |
|----|------------|---------|
| EP | 1601136 A1 | 11/2005 |
| WO | 2007056519 A1 | 5/2007 |
| WO | 2007063168 A1 | 6/2007 |

OTHER PUBLICATIONS

IEEE Standard for Local and Metropolitan Area Networks: "Part 16: Interface for Fixed Broadband Wireless Access Systems" WirelessMAN 802.16, Dec. 6, 2001, pp. 1-349.
(Continued)

*Primary Examiner* — Derrick Ferris
*Assistant Examiner* — Farhad Ali
(74) *Attorney, Agent, or Firm* — Laurence A. Greenberg; Werner H. Stemer; Ralph E. Locher

(57) ABSTRACT

A method for transmitting data in a wireless radio network having a multiplicity of base stations for wirelessly sending and receiving data, wherein the base stations are wirelessly networked such that each base station can communicate wirelessly with one or more adjacent base stations. Broadcast messages are transmitted between a mobile station for wirelessly sending and/or receiving data and the base stations and broadcast messages are also forwarded between the base stations. These broadcast messages do not have an associated explicit connection between two units in the radio network. Moreover, the mobile station which receives a broadcast message can process this message regardless of the base station from which it originates. This avoids so-called "hand offs," which are used in the prior art to associate a mobile station with a new base station when the mobile station moves out of range of the earlier base station. These hand offs result in time delays which are unacceptable in safety-critical applications. The novel method is particularly suitable for use in traffic systems, particularly in rail traffic systems, in which, by way of example, a train is controlled via a central unit using the radio network. In such applications, it is particularly important for no relatively long delays to arise in the data transmission, since otherwise the safety of the traffic system is no longer assured.

20 Claims, 1 Drawing Sheet

(51) Int. Cl.
*H04W 36/18* (2009.01)
*H04W 84/22* (2009.01)
*H04W 92/20* (2009.01)

(56) References Cited

U.S. PATENT DOCUMENTS

| | | | |
|---|---|---|---|
| 2003/0091011 A1* | 5/2003 | Roberts et al. | 370/338 |
| 2004/0029602 A1* | 2/2004 | Kunihiro | 455/500 |
| 2005/0259619 A1* | 11/2005 | Boettle et al. | 370/331 |
| 2007/0104199 A1* | 5/2007 | Taha | 370/392 |
| 2007/0268155 A1* | 11/2007 | Holmes et al. | 340/901 |
| 2009/0219900 A1 | 9/2009 | Kokkinen et al. | |

OTHER PUBLICATIONS

IEEE P802.11s/D0.02: Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking, Jun. 2006, pp. 1-218.

IEEE Wireless LAN Edition: "A Compilation Based on IEEE Std 802.11-1999 (R2003) and Its Amendments", pp. 1-706.

IEEE 802.11r/D5.0: "Draft Standard for Information Technology—Telecommunications and Information Exchange Between Systems—Local and Metropolitan Area networks—Specific Requirements, Part 11: Wireless LAN Medium Access Control (MAC) and Physical Layer (PHY) Specifications, Amendment 2: Fast BSS Transition", Mar. 2007, pp. 1-115.

Bahr, et al: "Joint SEE-Mesh/Wi-Mesh Proposal to 802.11 TGs", IEEE 802.11.06/0328Ro, XP-002449485, Feb. 27, 2006, pp. 1-165.

Guido Hiertz: "Radio Meshing", Standard for WLAN-Mesh-Networks Attains Draft Status, Issue No. 5, 2007, pp. 1-8, Hannover, Germany.

* cited by examiner

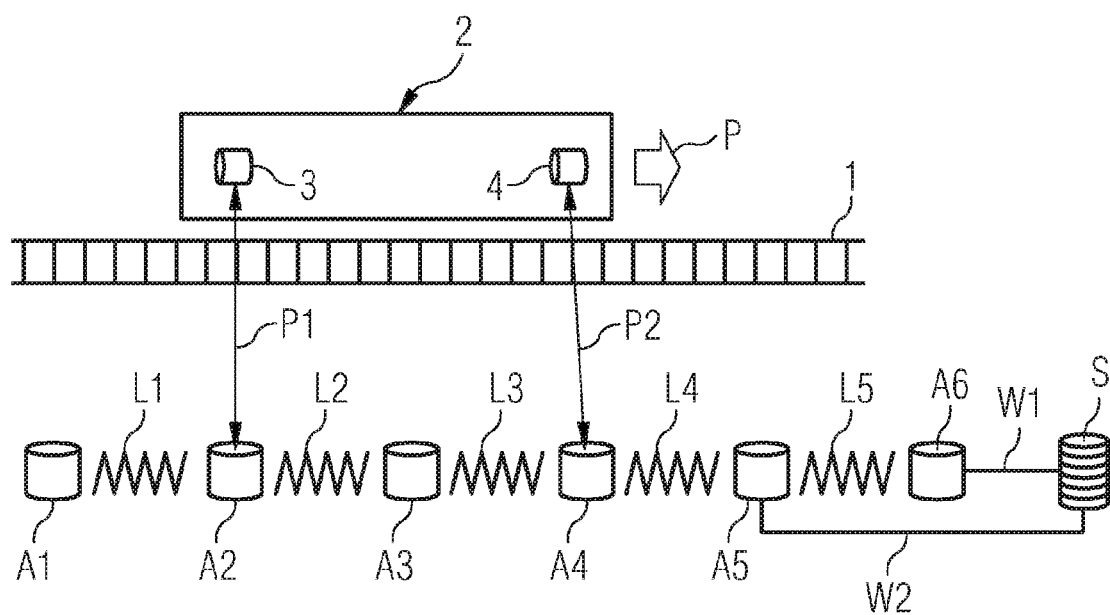

METHOD FOR TRANSMITTING DATA IN A WIRELESS RADIO NETWORK

BACKGROUND OF THE INVENTION

Field of the Invention

The invention relates to a method for transmitting data in a wireless radio network having a multiplicity of base stations for wirelessly sending and receiving data.

Wireless radio networks, in particular non-cellular systems conforming to the WLAN standard IEEE 802.11 or 802.16, are used nowadays in a multiplicity of technical application fields. In particular, such networks are used for exchanging data with mobile stations which move at high speeds, such as e.g. motor vehicles or rail vehicles. Such radio networks are used, for example, for multimedia communication. It is desirable also to use such wireless radio systems for safety-critical communication applications. An example of such a safety-critical application is the control of a train via the radio network, for example, in order to transmit to the train through the wireless radio network commands or signals for controlling and monitoring the train.

In safety-critical applications, wireless radio networks have to meet very high reliability requirements, in particular the radio network used has to be redundantly designed and the response times in cases of failure have to be very short in order, for example, to prevent emergency stops, which occur in trains if the train is, for a predefined period, for example for more than 0.3 s, unable to generate a connection to a relevant central control system.

Radio networks conforming to today's standards are not suitable for use in safety-critical applications since, in the case of a moving mobile station, the length of time for handoffs (i.e. for the re-orientation of a mobile station to a new base station when the mobile station is out of range of the old base station) is associated with long delays. In the WLAN standard 802.11r, handoffs require several milliseconds, which is not tolerable for safety-critical communication.

In order to minimize the delays in handoffs, non-standardized proprietary systems have been developed, but these have different problems. In particular, there is the very great risk in these systems that the optimization of standardized safety mechanisms may give rise to new and previously unknown safety problems. An improvement can also be achieved through optimizations on higher layers of the OSI reference model. However, such optimizations also do not eliminate the fundamental problem of a delay occurring as a result of handoffs on the L2 layer.

The printed publication US 2004/0029602 A1 discloses a method for the transmission of data in a wireless radio network comprising a mobile station and a plurality of base stations. According to the method, data is transmitted between adjacent base stations via a direct radio connection between these base stations.

Document U.S. Pat. No. 5,914,948 describes wireless data transmission between a mobile station on a rail vehicle and corresponding base stations along the traffic route. All the base stations use the same carrier frequencies to communicate with the mobile station.

BRIEF SUMMARY OF THE INVENTION

The object of the invention is therefore to establish a method for transmitting data in a wireless radio network which has such small delays in the transmission of data that it can be used for safety-critical applications.

This object is achieved in the independent claims. Developments of the invention are defined in the dependent claims.

In the method according to the invention, a radio network is used which comprises a multiplicity of wirelessly networked base stations, the networking of the base stations being configured such that each base station can communicate wirelessly with one or more adjacent base stations. The term "base station" is to be understood here in the broad sense and covers any stationary unit in a radio network which can receive and send data wirelessly in the radio network. In a preferred embodiment, a non-cellular local radio network, in particular the WLAN network (WLAN=wireless local area network) mentioned previously hereinabove, is used for data transmission. Where such networks are used, the base stations can be equated to access points to such a local radio network. In the invention, a WLAN network conforming to IEEE standard 802.11 or 802.16 is preferably used (IEEE=Institute of Electrical and Electronics Engineers). The networking of the base stations just described is preferably implemented in conformance with IEEE specification 802.11s.

The method according to the invention is characterized by data transmission in which broadcast messages are used at least in part for transmitting information wirelessly between a mobile station for wirelessly sending and/or receiving data and the base stations. A broadcast message is to be understood here as a message which can be processed by the mobile station and the base stations irrespective of where the message was transmitted. In particular, a broadcast message is not associated with a communication connection between two nodes/units in the radio network. The information contained in the broadcast message can consequently always be processed by a mobile station which receives this message from a base station within radio range of the mobile station, and it can be processed irrespective of the base station from which the message originates. Likewise, the base stations can process broadcast messages received by them appropriately. In doing so, the base stations do not extract the content of the broadcast message, but forward the received broadcast messages. This means that a base station which receives a broadcast message re-emits the broadcast message. In this way, a relay network is created by the base stations so information can reach the mobile station or can be fed by the mobile station into the radio network via the forwarding mechanism of the base stations.

Use of the broadcast messages just described means that, according the invention, it is no longer necessary for handoffs to be carried out in order to associate the mobile station with a new base station when the mobile station moves out of range of the previous base station. Consequently, no lengthy failures occur in the data connection between mobile station and the rest of the radio network, so the method is suitable for using for safety-critical applications.

In a preferred embodiment of the inventive method, data is transmitted between a central unit, for example a control unit for the mobile station, and the mobile station via the wireless radio network, the central unit having at least one communication connection with one or more base stations of the radio network. This communication connection does not necessarily have to be wireless, but can also be configured in a wirebound manner. The relevant information to be transmitted is fed into the radio network via this communication connection and forwarded from there by means of the broadcast messages described above. Similarly, information from a mobile unit which emits broadcast messages into the radio network passes via this communication connection to the central unit.

In one embodiment of the invention, information regarding the radio connections between the base stations and between the mobile station and the base station or base stations within range of the mobile station, in particular the channels of the radio connections used, is filed in the central unit. The base stations can then access this information in order to ensure that the broadcast messages are always sent within range of the mobile station on a channel on which the mobile station also receives. This ensures that adjacent base stations send on the same channel so that forwarding of the broadcast messages is assured.

As already mentioned hereinabove, the invention is particularly suitable for use in safety-critical applications, for example in a traffic system in which the mobile station is a transport means, moving on a traffic route, having one or more antennae for communicating with the radio network, the base stations of the radio network being positioned at intervals along the traffic route. Here, the interval between the base stations is chosen such that a transport means moving on the traffic route is always within range of a base station and that consequently no communication interruptions occur. A particular application field of the invention is its use in a rail traffic system, the traffic route in this case being a rail route and the transport means a rail vehicle, in particular a train for transporting passengers and/or goods.

Where the invention is used in a traffic system, the central unit described hereinabove is preferably a control unit of the traffic system, which makes it possible, for example, for a train to be controlled without human conductors.

In a further embodiment of the method according to the invention, the base stations of the radio network can determine via broadcast messages emitted by the mobile station whether they are within range of the mobile station. These broadcast messages may be the broadcast messages described hereinabove which are used for data transmission. However, it is also possible for the broadcast messages emitted by the mobile station to serve not for transferring information but to be used merely for locating the position of the train. In this case, the broadcast messages are beacons whose range is greater than that of broadcast messages which also contain the data to be transferred.

In a further embodiment of the inventive method, the base stations also transmit in the broadcast messages which they emit local information relating to the environment of the respective base station. Such information may relate to hazards that occur; for example, it could be detected by means of a sensor whether objects are located on a section of the traffic route which the mobile station is traveling along. To reduce the volume of data transferred, the base stations preferably transmit this local information only when they are located within range of the mobile station, which can be determined, for example, by means of the beacons described hereinabove.

A particularly simple implementation of the inventive method can be achieved whereby the base stations and the mobile station send and/or receive on the same radio channel. In this case, no checking of the channels has to be carried out in the radio network to ensure that the base stations and the mobile station are always set to a suitable radio channel so that the forwarding of the broadcast messages between the base stations and the exchange of these messages between mobile station and an appropriate base station is assured.

In a further preferred embodiment of the method according to the invention, the base stations within range of the mobile station also communicate to their adjacent bases stations information about the radio connection used between the mobile station and the base stations within range of the mobile station. This information comprises, in particular, information as to the radio channel on which data transmission takes place between the mobile station and the base stations within range of the mobile station. This ensures that, whenever the mobile station moves within range of a new base station adjacent to the previous base station, the correct radio channel can always be set. This is achieved whereby the base stations which are adjacent to the base stations within range of the mobile station set the radio channel contained in the information regarding the radio connection when they determine that they are located within range of the mobile station.

In a further embodiment of the method according to the invention, at least some of the base stations also have wire-bound connections, broadcast messages also being forwarded via the wire-bound connections. In this case, the scalability and redundancy of the system are increased, since when a wireless connection fails, the system can fall back on the broadcast messages transmitted in a wire-bound manner. The information content of these wire-bound broadcast messages is the same as that of the broadcast messages transmitted wirelessly.

In a further embodiment of the method according to the invention, network coding methods known from the prior art are used for data transmission, it being possible with these techniques to achieve data transmission optimized in terms of redundancy and data rate.

Besides the method described hereinabove, the invention also comprises a wireless radio network having a multiplicity of base stations for wirelessly sending and receiving data, the base stations being wirelessly networked such that each base station can communicate wirelessly at least with an adjacent base station. The radio network is configured here such that data transmission between a mobile station for wirelessly sending and/or receiving data and the base stations takes place at least in part by means of wirelessly transmitted broadcast messages, broadcast messages being exchanged between the mobile station and as least one base station within range of the mobile station and broadcast messages being forwarded by the base stations such that a base station which receives a broadcast message re-emits the broadcast message. The radio network is preferably configured here such that each variant of the inventive method described hereinabove can be executed by means of the radio network.

Exemplary embodiments of the invention will be described in detail below with the aid of the attached FIGURE, in which:

BRIEF DESCRIPTION OF THE SEVERAL VIEWS OF THE DRAWING

FIG. 1 shows a schematic representation of a radio network in which an embodiment of the inventive method is executed.

DESCRIPTION OF THE INVENTION

FIG. 1 shows a rail traffic system having a rail track 1 on which rail vehicles in the form of trains can move. In FIG. 1, a mobile object in the form of a train moving to the right is indicated by the reference character 2, the direction of movement of the train being represented by the arrow P. Along the rail track, access points to a WLAN network are arranged at regular intervals, a WLAN network conforming to IEEE standard 802.11 or 802.16 preferably being used. In the example shown in FIG. 1, six access points A1, A2, A3, A4, A5 and A6 are shown which are positioned such that each access point can communicate wirelessly at least with its immediate neighbor. The wireless communication connections between the access points are indicated schematically in FIG. 1 by zigzag lines L1, L2, L3, L4 and L5. An access point preferably has a communication connection not only with its immediate neighbor but also with further neighbors, the susceptibility of the system to faults being reduced as a result. In particular, each access point can, for example, have or establish a communication connection with its nearest and second-nearest neighbors in both directions along the rail route. The network which is formed by the communication connections between the access points can be generated, for example, on the basis of IEEE standard 802.11s.

In the example shown in FIG. 1, wireless control of the train 2 is to be implemented with the aid of the central server S.

The server here is connected via two wire-bound connections W1 and W2 firstly to the access point A6 and secondly to access point A5. The server generates, in particular, control commands for the driving of the train which are to be transmitted to the train. Similarly, the server can be configured for receiving control information from the train. One application field is, for example, driverless control of the train 2 on the rail route 1.

The transmission of information between server and train is effected according to the invention wirelessly by means of broadcast messages, i.e. by means of messages which are not associated with any fixed connection between two units in the network. If, for example, a control command is transmitted from the server S to the train 2, the broadcast message concerned is firstly fed into the wireless radio network via the access points A5 and A6. The radio network is configured such that it functions as a relay network in which each access node re-emits a broadcast message received by it. In this way, the broadcast message which contains the corresponding control command can be distributed throughout the network between all access points A1 to A6. The train 2 has two send-and-receive antennae 3 and 4 with which the broadcast messages which have been emitted by the access points, within radio range of which antenna 3 or 4 is located, can be received. In the example shown in FIG. 1, antenna 3 receives the broadcast message from access point A2, whereas antenna 4 receives the broadcast message from access point A4. This is indicated in FIG. 1 by means of the double-headed arrows P1 and P2. The use of two antennae here reduces the redundancy of the system and thus its susceptibility to faults.

Due to the use of broadcast messages, there is no explicit association between antenna 3 or 4 and a corresponding access point in the radio network. This means that no time-consuming handoff is required when the train, in moving, leaves the range of one access point and enters the range of a new access point. According to the invention, such a handoff is not therefore required because the antennae 3 and 4 on the train can always process the broadcast signals, irrespective of the access point from which the signals originate.

In a preferred variant of the method according to the invention, there is also the possibility of the access points A1 to A6 determining whether a train is located within their range. This can be effected, for example, by the antennae 3 and 4 of the train 2 continuously emitting so-called beacons, such that an access point which receives such beacons can establish from these that it is located within range of the train. This creates the possibility, for example, for access points which are located within range of the train additionally to emit, with the broadcast message, local information in the area around the access point concerned so as to inform the train, for example, about local hazards. Such a hazard could be an object on the rail which has been detected from the access point concerned by additional sensors. Should the individual access points not always transmit broadcast messages on the same channels, the information as to which access points lie within range of the antennae of the train could also be used for the access point within range of the train to communicate to its adjacent access points the channel via which data is being exchanged with the antennae of the train. If a neighboring node then establishes that it lies within range of the antenna of the train, this neighboring node then switches to this channel in order in this way to assure the data exchange of broadcast messages between train and radio network.

As can be seen from the comments above, according to the invention a so-called broadcast cloud is created which is defined by the access points within range of the antennae of a moving train, said broadcast cloud following the movement of the train. In a preferred variant, so-called network coding techniques could also be used for transmitting data efficiently. Such network coding techniques are adequately known from the prior art. Examples are Cope or Avalanche. The use of such techniques makes it possible for redundancy to be achieved in the transmission of information, thereby reducing the susceptibility of the system to faults.

The inventive method just described has a number of advantages. In particular, the use of a wireless radio network reduces the amount of cabling so that such networks can be installed and maintained more easily. The availability of the overall network is improved since the radio network used has a fault probability which is lower than where cables are used. A further critical advantage of the radio network described hereinabove is that no handoff delays occur when a mobile object is moving since the radio connections are not treated as unicast connections. Consequently, a mobile object does not have to be associated with specified access points, as is the case in the prior art. Instead, the object receives the adaptive broadcast cloud moving in parallel with the movement of the object and reads out from this cloud the information contained therein. In addition, in the radio network according to the invention, no switchovers have to be made in the event of access points failing. In the event of failure of an access point or a communication connection between two access points, no backup system or reconfiguration of the system has to be implemented. Provided that each access point has redundant wireless communication connections with other access points, the data connection is in the event of failure of a communication connection maintained via this wireless communication connection. As already described hereinabove, network coding techniques can also be used in the system according to the invention in order to reduce the susceptibility to faults and also to use low-reliability wireless communication connections for transmission.

The invention claimed is:

1. A method for transmitting data in a wireless radio network having a multiplicity of base stations for wirelessly sending and receiving data, wherein the base stations are wirelessly networked, enabling each of the base stations to communicate wirelessly with one or more adjacent base stations, the method which comprises:

transmitting data between a mobile station for wirelessly sending and/or receiving data and the base stations at least partially by way of wirelessly transmitted broadcast messages;

forwarding the broadcast messages from the base stations by retransmitting a message received by a given base station in form of a retransmitted broadcast message;

exchanging the broadcast messages between the mobile station and at least one base station within range of the mobile station; and transmitting data between a central unit and the mobile unit via the wireless radio network, and wherein the central unit has at least one communication connection to one or more base stations of the radio network;

wherein the mobile station is integrated in a train of a rail traffic system, wherein the train travels along a rail route and is provided with one or more antenna for communicating with the radio network, and wherein the base stations are positioned at intervals along the rail route.

2. The method according to claim 1, which comprises using a non-cellular local radio network for transmitting data, wherein the base stations are access points to the local radio network.

3. The method according to claim 2, which comprises using a WLAN network for radio transmission.

4. The method according to claim 3, wherein the WLAN network is a network conforming to IEEE standard 802.11 and/or 802.16.

5. The method according to claim 4, wherein the base stations are networked in conformance with IEEE specification 802.11s.

6. The method according to claim 1, which comprises storing information regarding the radio connections between the base stations and between the mobile station and the base station or base stations within range of the mobile station in the central unit.

7. The method according to claim 6, which comprises storing channels of the respective radio connections in the central unit.

8. The method according to claim 1, which further comprises transmitting data between a central unit and the mobile unit via the wireless radio network, and wherein the central unit has at least one communication connection to one or more base stations of the radio network, and the central unit is a control unit of the traffic system.

9. The method according to claim 1, wherein the base stations determine, from broadcast messages emitted by the mobile station, whether they are located within range of the mobile station.

10. The method according to claim 9, wherein the broadcast messages emitted by the mobile station, by means of which the base stations determine whether they are located within range of the mobile station, are beacons and/or broadcast messages used for data transmission.

11. The method according to claim 9, wherein the base stations also transmit in their emitted broadcast messages local information concerning an environment of the respective base station.

12. The method according to claim 11, which comprises transmitting the local information exclusively with base stations within range of the mobile station.

13. The method according to claim 1, which comprises sending and/or receiving with the base stations and the mobile station on a common radio channel.

14. The method according to claim 1, in which the base station or base stations within range of the mobile station also communicate to their adjacent base stations information regarding the radio connection used between the mobile station and the base stations within range of the mobile station.

15. The method according to claim 14, in which the information regarding the radio connection comprises information as to the radio channel on which data transmission takes place between the mobile station and the base stations within range of the mobile station.

16. The method according to claim 15, wherein the base stations adjacent to the base stations within range of the mobile station adjust the radio channel contained in the information regarding the radio connection when they determine that they are within range of the mobile station.

17. The method according to claim 1, wherein at least some of the base stations also have wire-bound connections, and wherein the broadcast messages are also forwarded via the wire-bound connections.

18. The method according to claim 1, which comprising utilizing a network coding method for transmitting data.

19. A wireless radio network, comprising:
a multiplicity of base stations for wirelessly sending and receiving data; and
a central unit and a mobile unit configured for transmitting data there between via the wireless radio network, said central unit having at least one communication connection to one or more of said base stations;
wherein said base stations are wirelessly networked to enable each base station to communicate wirelessly with one or more adjacent base stations;
wherein the radio network is configured for data transmission between a mobile station for wirelessly sending and/or receiving data and said base stations at least partially by way of wirelessly transmitted broadcast messages, wherein the broadcast messages are forwarded by said base stations such that a base station which receives a broadcast message re-emits the received broadcast message; and
wherein the broadcast messages are exchanged between the mobile station and at least one said base station within range of the mobile station;
wherein said mobile station is integrated in a train of a rail traffic system, wherein said train travels along a rail route and is provided with one or more antenna for communicating with the radio network, and wherein said base stations are positioned at intervals along the rail route.

20. The radio network according to claim 19, configured to execute the method according to claim 1.

* * * * *